United States Patent
Sato et al.

(10) Patent No.: US 6,445,690 B2
(45) Date of Patent: *Sep. 3, 2002

(54) WIRELESS COUPLING OF INCOMPATIBLE NODES VIA A VIRTUAL NETWORK

(75) Inventors: Takashi Sato, Scarborough, NY (US); Samir Hulyalkar, Bensalem, PA (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,212

(22) Filed: Jun. 8, 1998

(51) Int. Cl.[7] .............................. H04L 12/28; H04Q 7/24
(52) U.S. Cl. .................. 370/338; 370/401; 370/409; 370/465; 709/230; 709/249
(58) Field of Search .................. 370/328, 329, 370/338, 389, 400, 401, 409, 465, 466, 467, 395.1, 396, 397; 709/201, 220, 227, 230, 238, 249

(56) References Cited

U.S. PATENT DOCUMENTS

| | | | | |
|---|---|---|---|---|
| 5,159,592 A | * | 10/1992 | Perkins | 370/85.7 |
| 5,309,437 A | * | 5/1994 | Perlman et al. | 370/85.13 |
| 5,394,402 A | * | 2/1995 | Ross | 370/94.1 |
| 5,481,535 A | | 1/1996 | Hershey | 370/60 |
| 5,502,726 A | | 3/1996 | Fischer | |
| 5,572,528 A | * | 11/1996 | Shuen | 370/85.13 |
| 5,734,824 A | | 3/1998 | Choi | 395/200.11 |
| 5,825,772 A | * | 10/1998 | Dobbins et al. | 370/396 |
| 5,878,232 A | * | 3/1999 | Marimuthu | 395/200.79 |
| 6,016,318 A | * | 1/2000 | Tomoike | 370/401 |

FOREIGN PATENT DOCUMENTS

| | | | | |
|---|---|---|---|---|
| EP | 0549235 A1 | 6/1993 | | H04L/12/28 |
| JP | 637763 A | 2/1994 | | H04L/12/28 |
| WO | WO8807794 | 10/1988 | | H04L/11/16 |
| WO | WO9307691 | 4/1993 | | H04J/3/16 |
| WO | WO9512942 | 5/1995 | | H04L/12/44 |
| WO | WO9729605 | 8/1997 | | H04Q/7/24 |

* cited by examiner

Primary Examiner—Alpus H. Hsu

(57) ABSTRACT

A method and apparatus are provided for establishing wireless communications between standardized and non-standardized information devices. In association with a network of standardized information devices, a virtual network is formed which includes a virtual node representing each of the non-standardized information devices.

20 Claims, 2 Drawing Sheets

WIRELESS COUPLING OF INCOMPATIBLE NODES VIA A VIRTUAL NETWORK

BACKGROUND OF THE INVENTION

1. Field of the Invention

The invention relates to wireless coupling in information systems and, in particular, to wireless coupling of standardized information devices to non-standardized information devices.

2. Description of Related Art

Wireless coupling of information devices has been described in a number of publications. For example, published PCT Application Number WO 97/29605 describes a wireless virtual Local Area Network (LAN) which enables workgroup membership to be redefined without physical wiring changes. This is particularly useful, for example, to facilitate communication between remotely-located LANs and to permit ad hoc networking between a group of portable computers.

Such known wireless coupling arrangements are very useful, but they are limited to the coupling of standardized information devices, i.e. information devices that are adapted to communicate with each other in accordance with a common standard. A typical example is a network of computers that are adapted for communication over a common information bus. There are also, however, many other applications where it is desirable to establish wireless communications between standardized information devices and non-standardized information devices, i.e. information devices that are not adapted to communicate in accordance with a common standard. Non-standardized information devices include both standard-capable information devices, such as computers that have not been adapted to communicate in accordance with commonly-used standard, and standard-incapable information devices which do not have sufficient intelligence to be so adapted. Examples of typical standard-incapable information devices with which wireless communications are of particular interest are security apparatus, audio and video equipment, telephone equipment etc. Although it is possible to provide each non-standardized information device in a system with sufficient hardware to enable it to communicate in accordance with a common standard, this is an expensive and often impractical solution. It would require substantial modification of every non-standardized information device in the system.

SUMMARY OF THE INVENTION

It is an object of the invention to provide a method and apparatus for enabling economical wireless communication between standardized nodes and non-standardized nodes. As used herein:

"node" means any device that is capable of producing, processing or utilizing information;

"standardized node" means a node that is adapted for communicating with other nodes in accordance with a common standard;

"non-standardized node" means a node that is not adapted for communicating with other nodes in accordance with a common standard;

"wireless communication" means communicating information via any energy propagation mode which is feasible for the information being communicated, including, for example, radio frequency (RF), infra-red (IR), and sonic energy propagation modes.

It is another object of the invention to provide such a method and apparatus which automatically adapts to the addition and removal of both standardized and non-standardized nodes from a wireless communication system.

In a method in accordance with the invention, wireless communication in a system including standardized nodes and non-standardized nodes is achieved by:

establishing a virtual network including a respective virtual node representing each non-standardized node;

communicating information between each non-standardized node and the respective virtual node in a communication format/protocol compatible with that non-standardized node;

communicating information between each virtual node and the standardized nodes in a communication format/protocol compatible with the standardized nodes.

In an apparatus in accordance with the invention, a wireless information system is formed which includes:

at least one non-standardized node having a transceiver for wireless communication;

a standardized network including a bus for carrying communications between any standardized nodes that are connected to the bus;

a wireless station including a transceiver for wireless communication with the at least one non-standardized node;

a virtual network coupled to the wireless station and including a controller and a memory for cooperatively:

establishing in the memory a virtual node representing each non-standardized node;

communicating information between each non-standardized node and the respective virtual node in a communication format/protocol compatible with the non-standardized node;

communicating information between each virtual node and each standardized node in a communication format/protocol compatible with the standardized node.

DESCRIPTION OF THE PREFERRED EMBODIMENT

Figure 1:
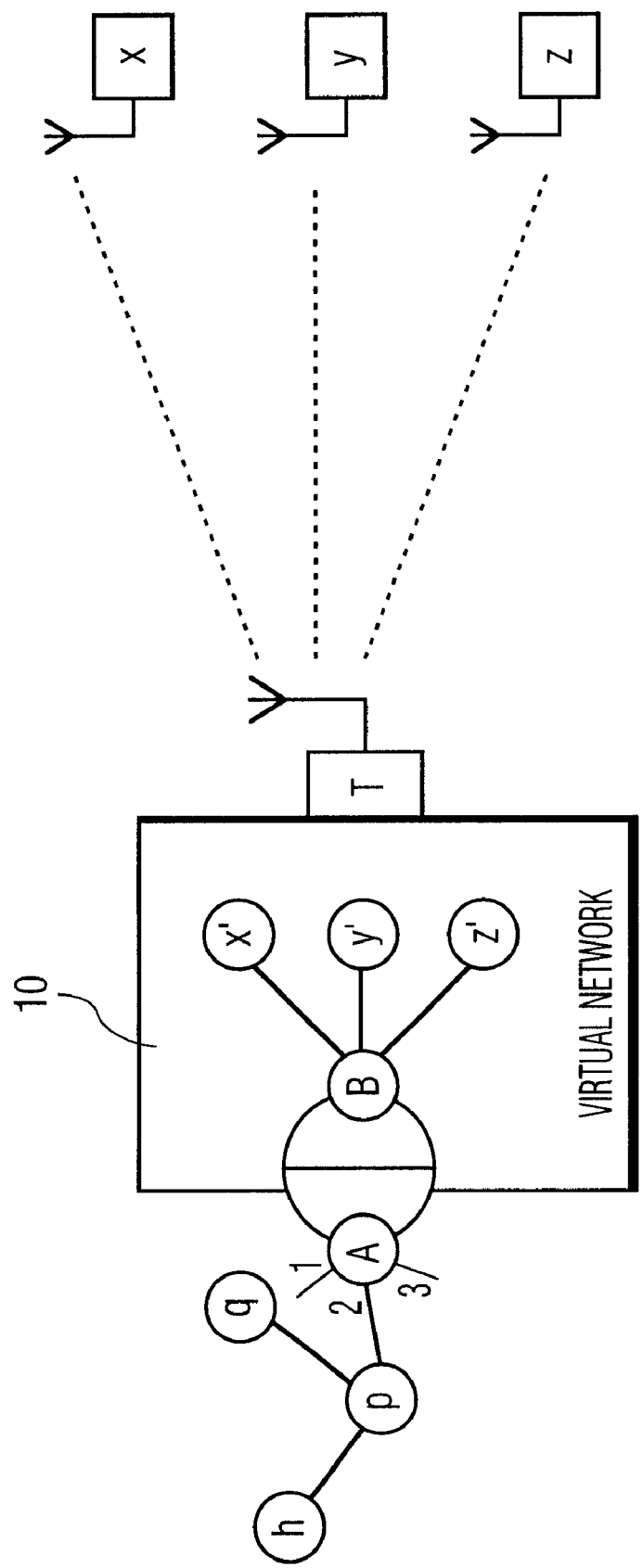
FIG. 1 is a schematic diagram illustrating an embodiment of an information system which communicates in accordance with the invention.

The information system of FIG. 1 includes a real network having standardized nodes h, p, q and a half bridge A, which is itself a standardized node; a plurality of non-standardized nodes x, y, z; a virtual network 10 having a virtual half bridge B and virtual nodes x', y', z'; and a wireless station T. Practical information systems of this type include, for example:

an office computer system having standardized nodes including personal computers h, p, q wired for communication over a common information bus with each other and with the half bridge A; and non-standardized nodes including a printer x, a hard-disc drive y, and an image scanner z;

a residential entertainment and security system having standardized nodes including a digital TV h, a digital VCR p, and a digital stereo system q, wired for communication over a common information bus with each other and with the half bridge A; and non-standardized nodes including a security system x, a wireless telephone y, and a loudspeaker system z.

The half bridge A controllably passes information between the real network and the virtual network. Depending on the design of the half bridge, it may also control the passage of information between the nodes h,p,q in the real network.

The non-standardized nodes x, y, z each include, in addition to a particular type of information device, a transceiver for wireless communication with the wireless station T. Each of these nodes also includes at least minimal intelligence for locally coordinating information flow between the respective information device and transceiver. Depending on the innate complexity of the particular information device, this minimal intelligence may take any one of a variety of forms, e.g. added logic hardware and/or software in an already-existing processor or microprocessor, a dedicated microprocessor, or dedicated logic hardware.

The wireless station T includes a local transceiver for wireless communication with the transceivers of nodes x, y, z and a wireless link for coordinating information flow between this local transceiver and the virtual network. The wireless station and the non-standardized nodes x, y, z also each include a respective transducer for propagating the mode of energy chosen for wireless communication. In the exemplary embodiment shown in FIG. 1, antennas are shown for propagating RF energy.

The virtual network 10 is a model that is formed with reference to the standardized half bridge A and the non-standardized nodes x, y, z. The virtual half bridge B is modeled to be complementary to the real half bridge A, such that half bridges A and B collectively form a standardized full bridge. The virtual nodes x', y', z' are modeled to represent the respective non-standardized nodes x, y, z, but modified to communicate with virtual half bridge B in the same standard as the real nodes h, p, q communicate with the real half bridge A.

Figure 2:
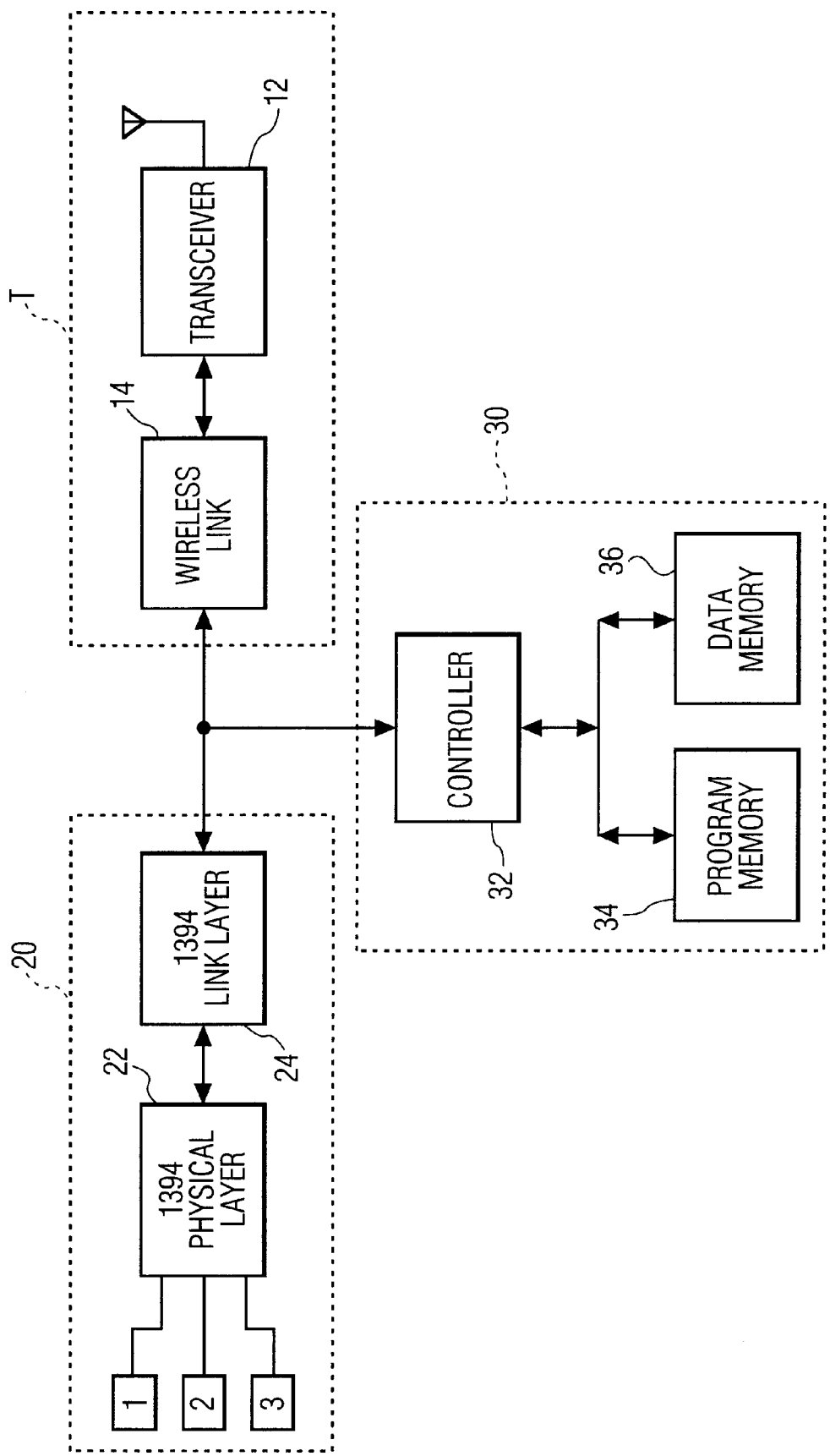
FIG. 2 is a block diagram illustrating an embodiment of a portion of the information system of FIG. 1.

FIG. 2 illustrates an exemplary embodiment of a subsystem for forming the half bridge A, the virtual network 10 and the wireless station T. This subsystem includes a bridge-interface unit 20, a virtual intelligence unit 30, and the wireless station T mentioned in conjunction with the description of FIG. 1.

The wireless station T includes a transceiver 12 and a wireless link 14. The transceiver is a conventional device, with the type of transceiver depending on the mode of propagation chosen for wireless communication. The wireless link 14 is also a conventional device for performing the functions of:
  converting signals received from the non-standardized nodes x, y, z, via the transceiver 12, to a format compatible with the virtual intelligence unit 30;
  converting signals received from the virtual intelligence unit to a format compatible with the transceiver and the non-standardized nodes; and
  exchanging timing and control signals with the virtual intelligence unit to effect arbitration, i.e. to coordinate the transfer of information to and from the non-standardized nodes.

The wireless link may be implemented by using, for example, a microprocessor and software for performing the format conversions. Alternatively, if the formats chosen for communication with the non-standardized nodes are not so complex as to require extensive hardware, the wireless link may be constructed by using logic circuitry. See, for example, the wireless link described in PCT Application WO 88/07794, published on Oct. 6, 1988.

The virtual intelligence unit 30 includes a controller 32, a program memory 34 and a data memory 36. The controller, which is coupled to the wireless station T and to the bridge-interface unit 20 via a bus, may be e.g. a microprocessor, a micro-controller or a digital signal processor. The controller, under the direction of instructions in the program memory, has the capability of cooperating with the wireless station T to:
  detect the existence of any non-standardized nodes (e.g. the nodes x, y, z) that are currently capable of wireless communication with the virtual network;
  form virtual nodes (e.g. the nodes x', y', z') representing the detected nodes by storing in the data memory a description of each real node (x, y, z) and data which is either received from, or to be transmitted to, the respective node;
  coordinating with the wireless station to exchange communications between the virtual nodes (x', y', z') and the real nodes (x, y, z).

Note that a variety of information may be stored in the program and data memories in association with the virtual nodes, including, for example:
  formatting information unique to each of the wireless nodes with which the station T establishes communication;
  algorithms for performing operations on data received from, or to be transmitted to, the wireless nodes;
  relative priorities for communications with the respective wireless nodes.

Note, further, that the virtual intelligence unit is easily adapted to changes in the types of non-standardized nodes with which the virtual network is to communicate. Information, e.g. program instructions and descriptive data, needed for communicating with new types of non-standardized nodes can be easily added to the program and data memories of the virtual intelligence unit.

The bridge-interface unit 20 and the virtual intelligence unit 30 cooperatively form the bridge comprising the two half bridges A and B. Half bridge A must communicate with nodes h,p,q in accordance with their common standard, while half bridge B must be capable of universally communicating with the virtual nodes x', y', z' in their respective formats. The half bridges may communicate with each other in any format common to each.

In the exemplary embodiment shown in FIG. 2, the standard chosen for the real network, having the nodes h,p,q and the half bridge A, is the IEEE 1394 Standard. This standard is described in detail in the publication IEEE Std 1394–1995, "IEEE Standard for a High Performance Serial Bus" (Aug. 30, 1996),which is hereby incorporated by reference. This is a particularly useful standard for high performance bus interconnection of computer peripherals and consumer electronics, including the transmission of high-speed digital video data.

Part of the half bridge A is formed by the bridge-interface unit, which includes a 1394-Standard physical layer 22 and a 1394-Standard link layer 24. Both of these layers are functional logic elements which are operationally described in the IEEE publication P1394.1 Draft 0.03, "P1394.1 Draft Standard for High Performance Serial Bus Bridges" (Oct. 18,1997), which is hereby incorporated by reference. The physical layer 22 includes exemplary ports 1,2,3 for physical connection to a common bus on which 1394-Standard nodes, e.g. the nodes h,p,q, communicate; ensures that only one node at a time transmits information on the common bus by providing an arbitration service; and converts communications received from the link layer 24 to the 1394 Standard. The link layer formats communications received from the physical layer into a standardized datagram which is addressed and framed for transmission to a predetermined one of the non-standardized nodes currently in communication with the wireless station T, i.e. node x, y or z.

The virtual intelligence unit 30 forms the remainder of the half bridge A and forms the virtual half bridge B. More specifically, the controller 32, together with the program memory 34 and the data memory 36, forms:

a common 1394.1-Standard switching fabric (internal fabric) coupling the two half bridges; and the remainder of half bridge B with links to the current virtual nodes (x', y', z')

What is claimed is:

1. A wireless information system for wireless communication with at least one non-standardized node adapted for communication in a communication/protocol compatible with the respective at least one non-standardized node and not adapted for communication with other nodes in accordance with a common standard and having a transceiver, wherein said non-standardized node lacks computing capability sufficient to communicate in accordance with said common standard, and said system includes:
   a. standardized network including a bus for carrying communications between any standardized nodes that are connected to the bus, said any standardized nodes being adapted for communicating wit other nodes in accordance with said common standard;
   b. a wireless station including a transceiver for wireless communication with the at least one non-standardized node;
   c. a virtual network coupled to the wireless station and including a controller and a memory for cooperatively:
      i. establishing in the memory a virtual node representing each said non-standardized node;
      ii. communicating information between each said non-standardized node and the respective virtual node in the communication format/protocol compatible with the respective said non-standardized node;
      iii. communicating information between each said virtual node and each said standardized node in a communication format/protocol compatible with said standardized node.

2. A system as claimed in claim 1, wherein said one non-standardized node is a printer.

3. A system as claimed in claim 1, wherein said one non-standardized node is at least one component of a residential entertainment system.

4. A system as claimed in claim 1, wherein said one non-standardized node is a security system.

5. A system as claimed in claim 1, wherein said one non-standardized node is a telephone device.

6. A wireless information system for wireless communication with at least one non-standardized node having a transceiver and being adapted for communication in a communication/protocol compatible with the respective at least one non-standardized node and not adapted for communication with other nodes in acordance with accordance with common standard, said system including:
   a. a standardized network including a bus for carrying communications between any standardized nodes that are connected to the bus, said any standardized nodes being adapted for communicating with other nodes in accordance with said common standard; wherein said standardized node comprises a real half bridge for communicating with other standardized nodes in the standardized network, and
   b. a wireless station including a transceiver for wireless communication with the at least one non-standardized node;
   c. a virtual network coupled to the wireless station and including a controller and a memory for cooperatively:
      i. establishing in the memory a virtual node representing each said non-standardized node;
      ii. communicating information between each said non-standardized node and the respective virtual node in the communication format/protocol compatible with the respective said non-standardized node;
      iii. communicating information between each said virtual node and each said standardized node in a co cation format/protocol compatible with said standardized node; and
      wherein the virtual network includes a virtual half bridge for communicating with the real half bridge, and for communicating with the virtual nodes in the communication format/protocol compatible with the respective non-standardized node.

7. A system as in claim 6, wherein said real half bridge is formed by a bridge interface unit including a physical layer and a link layer.

8. A system as in claim 7, wherein said physical layer is a 1394-Standard physical layer, and said link layer is a 1394-Standard link layer.

9. A system as in claim 6, wherein said virtual half bridge is formed by a virtual intelligence unit comprising said controller, and said memory comprises a program memory and a data memory.

10. A system as in claim 9, wherein said virtual intelligence unit forms a common 1394.1-Standard switching fabric for coupling the two half bridges.

11. A system as claimed in claim 6, wherein said one non-stadardized node is a printer.

12. A method as in claim 11, wherein the step of communicating between each non-standardized node and the respective virtual node comprises communicating by a wireless link.

13. A system as claimed in claim 6, wherein said one non-standardized node is at least one component of a residential entertainment system.

14. A system as claimed in claim 6, wherein said one non-standardized node is a security system.

15. A system as claimed in claim 6, wherein said one non-standardized node is a telephone device.

16. A method of wireless communication in a system including at least one standardized node adapted for communicating with other nodes in accordance with a common standard, and a non-standardized node adapted for communication in a communication/protocol compatible with the non-standardized node and not adapted for communication with other nodes in accordance with said common standard, wherein said non-standardized node lacks computing capability sufficient to communicate in accordance with said common standard, and said method comprises:
   a. establishing a viral node representing said non-standardized node;
   b. communicating information between said non-standardized node and the virtual node in the communication format/protocol compatible with the respective said non-standardized node, and
   c. communicating information between said virtual node and the at least one standardized node in a communication format/protocol compatible with said standarized node.

17. A method as in claim 16, where said at least one said standardized node is part of a standardized network comprising a plurality of said standardized nodes including, and the non-standardized node is one of a plurality of non-standardized nodes, comprising:

establishing a virtual network including a respective virtual node representing each of said plurality of non-standardized nodes, communicating information between each said non-standardized node and the respective virtual node in accordance with a communication format/protocol compatible with the respective said non-standardized node, and communicating information between each said virtual node and the associated standardized network in accordance with a communication format/protocol compatible with said common standard.

18. A method of wireless communication in a system including a plurality of standardized nodes adapted for communicating with other nodes in accordance with a common standard, and at least one non-standardized node adapted for communication in a communication/protocol compatible with the respective non-standardized node and not adapted for communication with other nodes in accordance with said common standard, wherein one of said standardized nodes comprises a real half bridge, and said method comprises:

communicating through said real half bridge between said one of said standardized nodes and others of said plurality of standardized nodes in accordance with said common standard, establishing a virtual network including a virtual half bridge, and a respective virtual node corresponding to each said non-standardized node, communicating between each said non-standardized node and the corresponding virtual node in a communication/protocol compatible with the respective non-standardized node, and communicating information through said virtual half bridge, in a communication format/protocol compatible with said common standard, between each respective node and said one standardized node.

19. A method as in claim 18 where the one standardized node is one of a plurality of said standardized nodes in a first network, and the non-standardized node is one of a plurality of non-standardized nodes in said virtual network, comprising:

using the real half bridge for communicating between the one standardized node and others of the plurality of standardized nodes in the first network in accordance with said common standard, and using a virtual half bridge for communicating wit the real half bridge and with the virtual nodes in said communication format/protocol compatible with said standardized node.

20. A method as in claim 18, wherein the step of communicating between each non-standardized node and the respective virtual node comprises communicating by a wireless link.

* * * * *